United States Patent [19]

Weber et al.

[11] 4,188,356

[45] Feb. 12, 1980

[54] METHOD AND AN APPARATUS FOR THE PRODUCTION OF A FOAM-FORMING REACTION MIXTURE OR HOMOGENEOUS MATERIAL-FORMING REACTION MIXTURE AND FOR THE SUBSEQUENT INTRODUCTION THEREOF INTO A CAVITY

[75] Inventors: Gerd Weber, Leverkusen; Dieter Skoupi, Linde; Hermann Schäfer, Leverkusen, all of Fed. Rep. of Germany

[73] Assignee: Bayer Aktiengesellschaft, Leverkusen, Fed. Rep. of Germany

[21] Appl. No.: 932,252

[22] Filed: Aug. 9, 1978

[30] Foreign Application Priority Data

Aug. 20, 1977 [DE] Fed. Rep. of Germany ....... 2737616

[51] Int. Cl.² .................................................. B29D 27/00
[52] U.S. Cl. ..................................... 264/40.1; 264/51; 264/328; 264/331; 264/DIG. 83; 425/146; 425/563; 425/817 R
[58] Field of Search ............... 264/DIG. 83, 328, 331, 264/40.1, 51, 54; 425/817 R, 562, 563, 146

[56] References Cited

U.S. PATENT DOCUMENTS

| 2,885,268 | 5/1959 | Breer et al. ................... 264/54 X |
| 2,948,928 | 8/1960 | Ebneth et al. ................. 264/54 |
| 3,122,785 | 3/1964 | Weinbrenner et al. ........... 264/54 X |
| 3,142,477 | 7/1964 | Gordon et al. ................ 264/54 X |
| 3,264,067 | 8/1966 | Alderfer ..................... 264/54 X |
| 3,912,234 | 10/1975 | Peter ....................... 425/817 R X |
| 3,913,892 | 10/1975 | Ersfeld et al. .............. 264/DIG. 83 |
| 3,975,128 | 8/1976 | Schluter .................... 425/817 R X |
| 3,991,147 | 11/1976 | Knipp et al. ................ 264/331 X |
| 4,013,391 | 3/1977 | Boden et al. ................ 264/DIG. 83 |
| 4,062,525 | 12/1977 | Harmon et al. ............... 425/562 X |

FOREIGN PATENT DOCUMENTS 2543877  4/1977  Fed. Rep. of Germany ...... 425/817 R

*Primary Examiner*—Philip Anderson
*Attorney, Agent, or Firm*—Gene Harsh; Joseph C. Gil

[57] ABSTRACT

The instant invention relates to a method and an apparatus for the production of a foam-forming reaction mixture or homogeneous material-forming reaction mixture from at least two liquid reactants and for the subsequent introduction thereof into a cavity, and in particular into the cavity of a mold. The reactants are introduced into a mixing zone where they are mixed together. The mixture is subsequently fed through an outlet of controlled cross-section and charged into a cavity. In order to carry out the method, an apparatus is provided which comprises a mixing chamber arranged in a housing and having inlet openings for the reactants and an outlet opening for the reaction mixture, wherein an adjustable baffle plate is arranged opposite the outlet opening axially of the outlet opening.

9 Claims, 6 Drawing Figures

METHOD AND AN APPARATUS FOR THE PRODUCTION OF A FOAM-FORMING REACTION MIXTURE OR HOMOGENEOUS MATERIAL-FORMING REACTION MIXTURE AND FOR THE SUBSEQUENT INTRODUCTION THEREOF INTO A CAVITY

BACKGROUND OF THE INVENTION

The production of molded articles from homogeneous materials, foams, structural foams, or integral skin foams, based, in particular, on polyurethane has become commercially very important. In particular, more and more molded articles are produced from the above-mentioned materials which must have high strength and, in some cases, will have surfaces which, when in use, are visible. The discharge of such liquid reaction mixtures from the mixing chamber and the subsequent introduction into the mold is particularly critical for the quality of the molded articles. In particular, highly viscous reaction mixtures are very difficult to prepare. The problem is further aggravated by the fact that more and more solid additives in the form of powder or small-particles or fillers have to be introduced into the cavity of the mold with the reaction mixture. These additives or fillers generally increase the viscosity. Many attempts have therefore been made to prevent any of the reactants from entering the cavity unmixed; to prevent air from entering the reaction mixture on the way from the mixing chamber to the cavity and in the cavity itself; to prevent turbulence which could cause streaks; and to prevent an uneven flow front of reaction mixture from building up. It is generally known that these problems can be overcome by means of a flow of reaction mixture which is as laminar as possible.

Various solutions have been found and are adequate in individual cases. The simplest solution is to allow the reaction mixture to flow into the open mold sufficiently slowly for it to flow into a laminar stream to the deepest part of the mold over a plane which is inclined as slightly as possible. Turbulence and cascading flows must be avoided. However, clearly, such a method of manufacture is not economical. This method is also not suitable for charging materials into closed molds since the filling procedure is not observable. Other solutions make use of a specially shaped runner. However, with these solutions it is necessary to provide specific operating conditions, for example with respect to the flow rate and viscosity of the reaction mixture, so that the apparatus cannot be used with all reacting systems. It has therefore already been proposed that the runner should be arranged in an exchangeable component so that the same apparatus may be operated with different runners and under different conditions. This necessarily means a greater expense.

Finally, an apparatus has been described in which an adjustable baffle plate is arranged opposite the outlet opening of the mixing chamber. The distance between the baffle plate and the outlet opening is adjustable to enable a perfect expanding flow to be obtained. However, the distance is fixed during the filling process. It is, of course, possible to move the baffle plate back just before the filling process ends so that it forms a plane surface with the wall of the mold in which it is placed. The entire space between outlet opening and baffle plate is thus completely filled upon completion of the filling process since, in this previously known apparatus, the space between the outlet opening of the mixing chamber and the baffle plate also forms part of the cavity of the mold so that the finished molded article also has a suitable thickness in this section (see e.g., German Pat. No. 2,348,658 and U.S. Pat. No. 3,991,147).

The object of the invention is therefore to find a method and an apparatus which ensures the production of molded articles which are substantially free of defects even under varying operating conditions, as is often required when changing the throughput or the viscosity of the reaction mixture.

DESCRIPTION OF THE INVENTION

Figure 1:
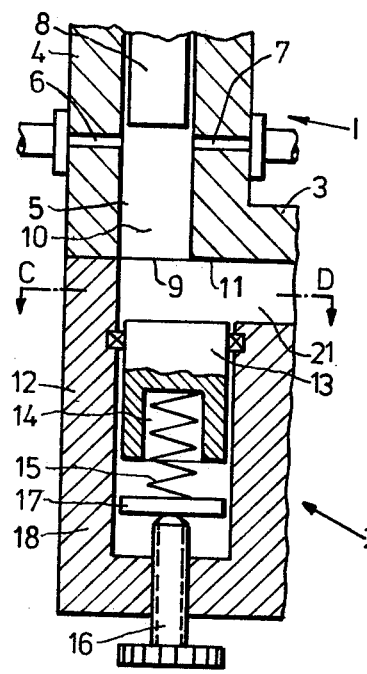
FIG. 1 is a longitudinal section of a first embodiment of the apparatus, taken along line A-B in FIG. 2.
Figure 3:
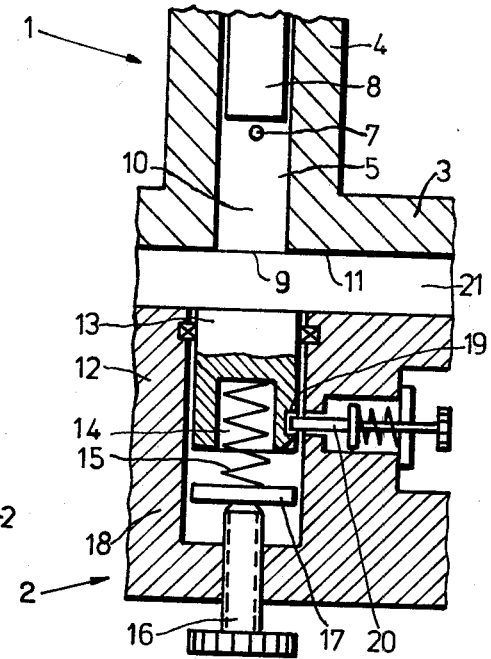
FIG. 3 is a longitudinal section of the apparatus of the first embodiment along line E-F in FIG. 2.
Figure 2:
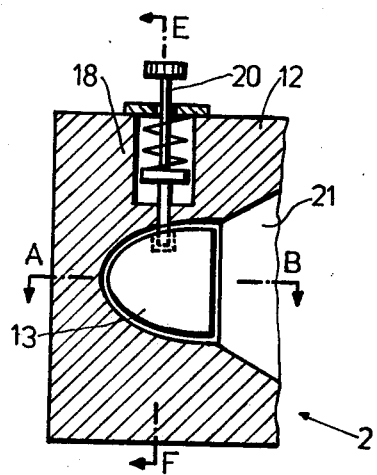
FIG. 2 is a cross section of the apparatus of the first embodiment along line C-D in FIG. 1.
Figure 4:
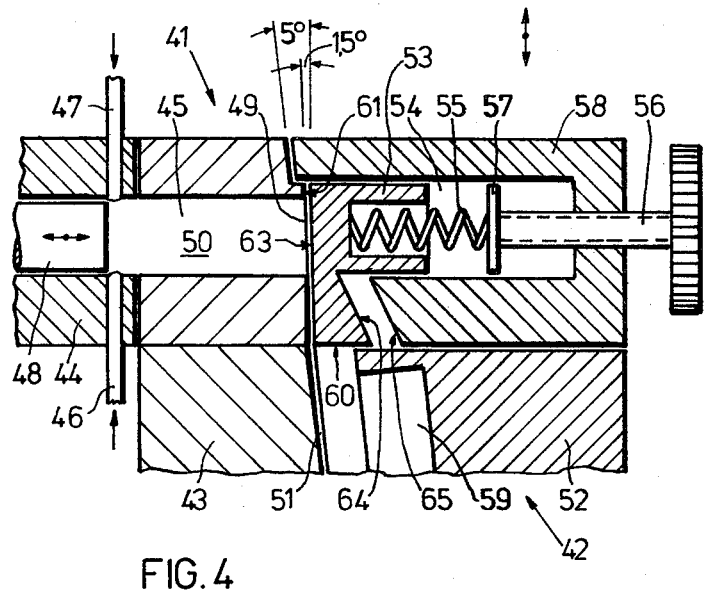
FIG. 4 is a longitudinal section of a second embodiment of the apparatus.
Figures 5, 6:
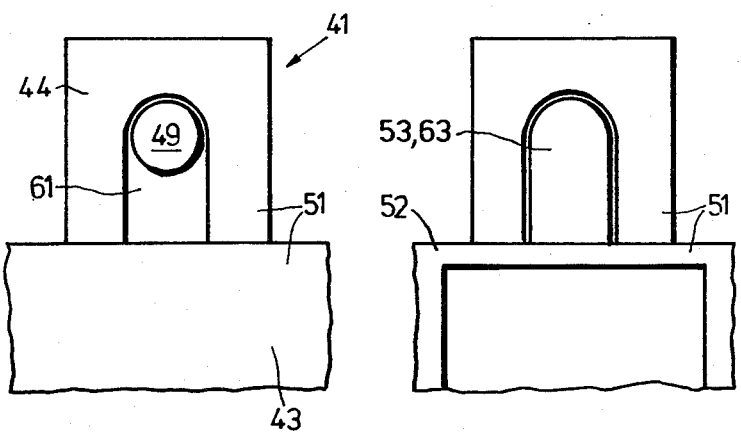
FIG. 5 is a plan view taken on the separation plane of the section of the molding box of the apparatus of the second embodiment on which the mixer head is arranged.
FIG. 6 is a plan view taken on the separation plane of the section of the molding box of the apparatus according to the second embodiment on which the baffle plate is arranged.

In terms of the method, the above-noted objects according to the invention are achieved in that the mixing zone is sealed before the reactants are introduced and is only opened automatically at a predetermined pressure by the pressure building up as the result of the introduction of the reactants. The cross-section of the outlet is also automatically adjusted and remains adjustable throughout the delivery procedure.

Thus, particularly at the beginning of the mixing process, reaction mixture is able to flow from the mixing chamber only when it is quite full. If one of the reactants rushes past when the inlet member is opened, there is no danger of this material being introduced unmixed into the cavity to be filled since such material is finally dispersed and thus made harmless as a result of the turbulence produced in the sealed mixing chamber. Just before the delivery procedure begins, the automatic adjustment of the cross-section of the outlet becomes particularly desirably noticeable since the delivery rate remains constant in accordance with the pressure regulated. The same applies to the end of the delivery procedure. The method according to the invention thus allows the flow rate of the reaction mixture to be kept constant in all critical phases, this constancy being a necessary condition for maintaining a laminar flow.

In a particular embodiment of the method according to the invention, the size of the outlet cross-section is fixed towards the end of the delivery process. Thus, if the space in the region of the outlet cross-section is also to be filled up, it is free of the closure element of the mixing zone.

The apparatus for carrying out the method is characterized according to the invention in that the baffle is resiliently mounted and seals the outlet opening before the mixing process begins.

This allows the outlet opening of the mixing chamber to be sealed off before the mixing process begins. The invention has proved particularly desirable with the generally known mixing heads with ejection pistons, in which the ejection piston presses the mixture completely out of the mixing chamber towards the end of the mixing process and thus cleans it. In this case, any air is forced out of the mixing chamber and the outlet opening is sealed by the baffle plate while the ejection piston is still in the ejection position. Indeed, increased power consumption is required for driving the ejection piston back since a vacuum is produced in the mixing chamber now being formed. However, the reaction mixture is no longer enriched with air in the mixing chamber. The baffle plate is adjustable so that it opens automatically when a predetermined pressure exists in the mixing chamber and the outlet cross-section is also adjusted automatically accordingly.

The baffle plate is preferably resiliently mounted. A mechanical spring provides the simplest method of mounting but hydraulic or pneumatic springs are also suitable. The spring is kept under initial tension so that this initial tension corresponds to that pressure which has to build up in the mixing chamber for the outlet opening to be released. By using springs with a wide variety of characteristics or by simultaneously using several springs nested in each other with various spring constants, it is possible to obtain a wide variety of effects using the various characteristics of spring travel which may thus be obtained. These effects provide for the laminar introduction of the reaction mixture into the cavity under a wide variety of conditions.

In a preferred embodiment of the apparatus according to the invention, the spring rests on an adjusting screw in the housing. The initial tension may thus be regulated and altered in a very simple fashion.

In another particular embodiment, a fixing mechanism is connected to the baffle plate. This may consist, for example, of a passage located laterally in the baffle plate into which may engage a pin mounted under spring bias in the housing. This embodiment is particularly advantageous if the cavity is that of a mold and the region between the outlet opening and baffle plate also belongs to the region of this cavity in which a molded article is formed. A mixer head known per se with an ejection piston is generally used in this case and pushes the remainder of the mixture from the mixing chamber into the mold cavity towards the end of the filling process. During the pushing process, the baffle plate is pressed back far enough to form a plane with the associated wall of the mold and the fixing mechanism is activated in this position. Its position obviously has to be adjusted in relation to the desired position of the baffle plate. The opening and closing direction of the mold preferably runs substantially parallel to the mold-separating plane thereof or, to obtain a better seal, at a small angle to it. This embodiment is particularly desirable because when the mold cavity is arranged desirably in relation to the outlet opening, it is possible to produce not only runnerless molded articles but also unmarked molded articles by using the automatically adjustable baffle plate according to the invention, since the marking coincides with an edge of the molded article.

The apparatus according to the invention may be designed for a wide variety of applications. The embodiment with an ejection piston/mixer head which is arranged on a mold has already been described above. The baffle plate according to the invention may also be used with a so-called manual mixer head which is mainly used for charging into open molds. Subsequent mixers may be dispensed with in this case. The baffle plate also replaces the other conventional means such as perforated discs or guide cones for building up the required impact pressure in the mixing chamber. In apparatuses which are suitable for the production of strand profiles, the baffle plate according to the invention has the advantage of permitting a reduction in the length of the mold required for forming the strand profile as the flow rates in the starting region are reduced.

The apparatus according to the invention is illustrated purely diagrammatically in the drawings showing two examples of a mixer head which operates with an ejection piston and is combined with a mold and is described in more detail below.

FIGS. 1 TO 3

A mixing head 1 is combined with a mold 2. A housing 4 for a passage 5 is placed on the upper section 3 of the mold. Inlet openings 6 and 7 are directed into this passage 5. An ejection piston 8 is drivably received in the passage 5 and is clear of the inlet openings 6 and 7 in the mixing position so that a mixing chamber 10 is formed between the inlet openings 6 and 7 and an outlet opening 9 situated at the end of the passage 5. A mold-separating plane 11 running level with outlet opening 9 separates the upper mold section 3 from the lower mold section 12. A baffle plate 13 is arranged opposite the outlet opening 9 in the lower mold section 12. The plate is guided in a passage 14 and mounted on a spring 15 resting on a disc 17 which is movable by means of an adjusting screw 16. The baffle plate 13 together with the surrounding housing 18 has a fixing mechanism consisting of a groove 19 and a locking pin 20 which may be manually withdrawn from the groove 19. The mold cavity is designated by reference numeral 21 and the sealing by 22.

FIGS. 4 TO 6

A mixing head 41 is combined with a mold 42. A housing 44 for a passage 45 is arranged on a molding box section 43. Inlet openings 46 and 47 are directed into the passage 45. An ejection piston 48 is guided in the passage 45 and is clear of the inlet openings 46 and 47 in the mixing position so as to form a mixing chamber 50 between the ejection piston 48 and an outlet opening 49 located at the end of the passage 45. A mold-separating plane 51 separates the two molding box sections 43 and 52. On the molding box section 52, a baffle plate 53 is placed in a passage 54 of a flanged-on housing 58. The plate is mounted on a spring 55 resting on a disc 57 which is movable by means of an adjusting screw 56. The mold 42 opens and closes perpendicularly to the axis of the mixing chamber 50 so that the molded article to be produced has no markings, since the edge 60 of the baffle plate 53 pointing towards the mold cavity 54 coincides with an edge of the molded article towards the end of the filling process. The mold separating plane 51 is at an angle of 5° to the opening and closing direction of the mold 42. A better seal is thus obtained. A sealing surface 61 projecting from the mold-separating plane 51 is arranged around the outlet 49 to correspond to the shape of the front face of the baffle plate 53 and is inclined at an angle of 1.5° to the opening and closing direction of the mold 42 as is the front face 63 of the baffle plate 53 so as to obtain a good seal. The rear of the baffle plate 53 has an undercut 64 on the side facing the molding box section 52 and this undercut 64 corresponds to an opposite face 65 of the housing 58 and provides a good seal in the fully open position.

What is claimed is:

1. In a method of producing a foam-forming or homogeneous material-forming reaction mixture from at least two liquid reactants and subsequently introducing it into a cavity, wherein the reactants are introduced into a mixing zone where they are mixed together, and wherein the mixture is subsequently fed through an outlet of regulated cross-section and charged into a cavity, the improvement wherein the outlet of the mixing zone is sealed before the reactants begin to be introduced into the mixing zone and is only opened at a predetermined pressure by the pressure building up therein as the reactants are introduced and wherein the outlet cross-section is automatically adjusted in response to said pressure buildup and remains adjustable throughout the delivery process.

2. The method of claim 1, characterized in that the size of the outlet cross-section is fixed towards the end of the delivery process.

3. An apparatus for mixing reacting materials, consisting of a mixing chamber arranged in a housing and having inlet openings for the reactants and an outlet opening for the reaction mixture to be introduced into a mold wherein an adjustable baffle plate is arranged opposite said outlet opening axially of the outlet opening, and further characterized in that the baffle plate is resiliently mounted, said outlet opening being sealed by said baffle plate and before the mixing process begins.

4. The apparatus of claim 3, characterized in that the baffle plate is mounted on a spring.

5. The apparatus of claim 4 characterized in that the spring rests on an adjusting screw in said housing.

6. The apparatus of claim 3, characterized in that a fixing mechanism is connected to said baffle plate.

7. The apparatus of claim 3, characterized in that the opening and closing direction of the mold runs parallel to a mold-separating plane.

8. The apparatus of claim 3 characterized in that the opening and closing direction of the mold runs at an angle of less than 10° to a mold-separating plane.

9. The apparatus of claim 3 wherein said apparatus is provided with an ejection piston located in said mixing chamber, and capable of pressing reaction mixture out of said mixing chamber.

* * * * *